No. 633,540. Patented Sept. 19, 1899.
C. H. WHEELER & F. W. KREMER.
RUBBER STEP FOR VEHICLES.
(Application filed Dec. 27, 1898.)

(No Model.)

Witnesses:
Marion W. Fuller

Inventors:
Charles H. Wheeler,
Frank W. Kremer,
by Humphrey and Humphrey,
attys.

THE NORRIS PETERS CO., PHOTO-LITHO., WASHINGTON, D. C.

UNITED STATES PATENT OFFICE.

CHARLES H. WHEELER, OF AKRON, AND FRANK W. KREMER, OF WADSWORTH, OHIO; SAID KREMER ASSIGNOR TO SAID WHEELER.

RUBBER STEP FOR VEHICLES.

SPECIFICATION forming part of Letters Patent No. 633,540, dated September 19, 1899.

Application filed December 27, 1898. Serial No. 700,427. (No model.)

*To all whom it may concern:*

Be it known that we, CHARLES H. WHEELER, residing at Akron, in the county of Summit, and FRANK W. KREMER, residing at Wadsworth, in the county of Medina, State of Ohio, citizens of the United States, have invented a certain new and useful Improvement in Rubber Steps for Vehicles, of which the following is a specification.

Our invention has relation to devices for forming and attaching a rubber coating to the steps of carriages and other vehicles to form a cushion for the same and present a surface to the foot that will prevent it slipping thereon.

The objects of our invention are to provide an improved cushion of the class named that can be readily applied to the step without removing it from the vehicle, that will prevent rattling between the cushion and the step, and that may be readily removed when worn to permit the substitution of a new one.

To the aforesaid objects our invention consists in the peculiar and novel construction, arrangement, and combination of parts hereinafter described and then specifically pointed out in the claims, reference being had to the accompanying drawings, forming a part of this specification.

Figure 1:
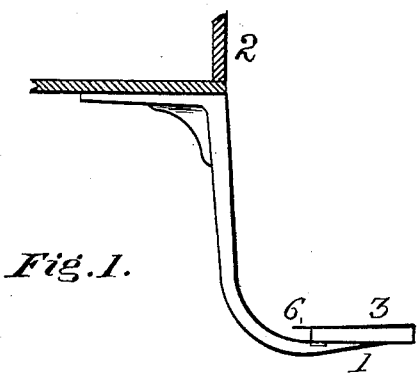
Figure 2:
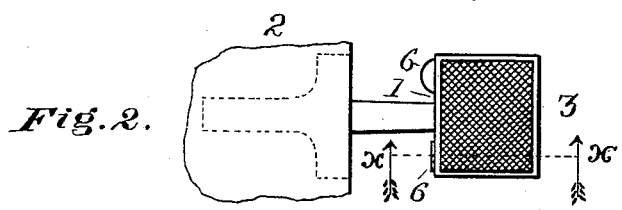
Figure 3:
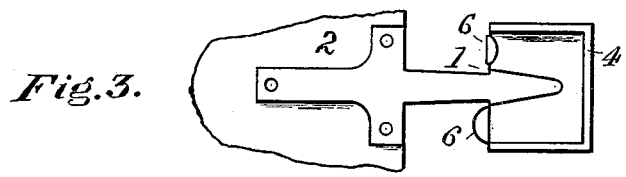
Figure 4:
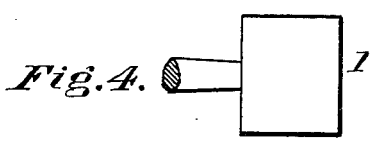
Figure 5:
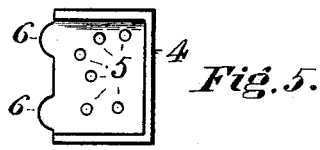
Figure 6:

In the accompanying drawings, in which similar reference-numerals indicate like parts in the different views, Figure 1 is a side view of a buggy-step provided with our improved cushion; Fig. 2, a plan or top view of the same with one fastening bent to place; Fig. 3, an inverted plan or bottom view of the same; Fig. 4, a plan of the step detached from the cushion; Fig. 5, a bottom view of the cushion detached, illustrating the form and construction of the supporting-plate to which the rubber is applied; and Fig. 6, an enlarged section of Fig. 2 at the line X X.

Referring to the figures, 1 is the buggy-step, and 2 a portion of the buggy-body to which it is attached. The cushion 3 consists of vulcanized rubber attached to a plate 4, of sheet iron, which is perforated with a number of holes 5 and has the front and side edges bent under to form ways, in which the step slides. At the back edge of this plate are projecting tongues 6, usually two in number, integral with the plate. This plate is coated on one face with prepared rubber, thicker toward the front edge of the step, where the greatest wear occurs, than at the rear portion, and then vulcanized in the usual manner in molds, that can give to the face of the rubber any desired corrugations or ornamental figures. In the process of vulcanizing the rubber expands and fills the holes 5 and flows through them, forming on the under side of the plate flat heads, thus clenching the rubber to the plate and materially assisting to secure it rigidly thereon and prevent it from becoming loose and also prevents the plate from rattling against the step when the buggy is being driven rapidly. These plates can be made of any desired size or form to conform to different sizes and styles of steps. In use they are applied by slipping them onto the step with the tongues 6 toward the buggy, and when in place these tongues are bent down around the back edge of the step, as illustrated in Figs. 2, 3, and 4, thus securing the cushion thereon.

We claim as our invention—

1. An improved cushion for buggy-steps consisting of a sheet-metal foundation-plate having the sides and front bent to form channels for the edges of the steps and malleable tongues to bend over the back edge, in combination with an adhering coating of rubber to cover the face of said plate, substantially as shown and described.

2. An improved cushion for buggy-steps consisting of a perforated sheet-metal foundation-plate having the sides and front bent to form channels for the edges of the step, and malleable tongues to bend over the back edge, and an adhering coating of rubber to cover the top and edges of said plate, substantially as shown and described.

In testimony that we claim the above we hereunto set our hands.

CHARLES H. WHEELER.
FRANK W. KREMER.

In presence of—
C. P. HUMPHREY,
C. E. HUMPHREY.